(12) United States Patent
Chakraborty et al.

(10) Patent No.: US 9,398,016 B1
(45) Date of Patent: Jul. 19, 2016

(54) CACHE-FREE AND LOCK-FREE HANDLING OF SECURITY INFORMATION FOR MULTIPLE DISTRIBUTED OBJECTS IN PROTECTION STORAGE SYSTEMS

(71) Applicant: EMC Corporation, Hopkinton, MA (US)

(72) Inventors: Subhasish Chakraborty, Livermore, CA (US); Terry Hahn, Los Altos, CA (US); Hongyu Zhang, San Jose, CA (US); Shruthi Herale, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 112 days.

(21) Appl. No.: 14/502,798

(22) Filed: Sep. 30, 2014

(51) Int. Cl.
*G06F 21/00* (2013.01)
*H04L 29/06* (2006.01)

(52) U.S. Cl.
CPC .............. *H04L 63/10* (2013.01); *H04L 63/20* (2013.01)

(58) Field of Classification Search
CPC .......... G06F 21/60; G06F 21/70; G06F 3/067
See application file for complete search history.

(56) References Cited

U.S. PATENT DOCUMENTS

| 8,612,696 B2 | 12/2013 | Zhu et al. | |
| 8,635,184 B2 | 1/2014 | Hsu et al. | |
| 2012/0166818 A1* | 6/2012 | Orsini | H04L 9/085 713/193 |
| 2014/0075565 A1* | 3/2014 | Srinivasan | H04L 63/104 726/26 |

FOREIGN PATENT DOCUMENTS

WO    WO2008008183 A3    1/2008

* cited by examiner

*Primary Examiner* — Izunna Okeke
(74) *Attorney, Agent, or Firm* — Staniford Tomita LLP (57) ABSTRACT

A native protection storage operating system (PSOS) process receives a request specifying an operation having security related implications for elements in the PSOS having a first set of components handling data transfer operations and a second set of components handling configuration operations. A security component stores an identifier of the requester and a security related information element locally within a storage location of the first or second set of components, and accesses, upon receiving the request, the security related information element and requester identifier to match other elements of the network impacted by the request, and performs a security condition specific check to determine whether or not the request is to be allowed or denied. The native process eliminates a need for caching, locking, and chain propagation of the security related information through the PSOS.

15 Claims, 5 Drawing Sheets

CACHE-FREE AND LOCK-FREE HANDLING OF SECURITY INFORMATION FOR MULTIPLE DISTRIBUTED OBJECTS IN PROTECTION STORAGE SYSTEMS

TECHNICAL FIELD

Embodiments are generally directed to protection storage systems, and more specifically to managing security information elements in purpose-built backup appliance (PBBA) clusters.

BACKGROUND

Protection storage using data de-duplication methods are widely used by enterprises for disk backup, archiving, and disaster recovery. Purpose-built backup appliances (PBBAs) are disk-based devices that utilize disk arrays that are used as targets for backup data and replicated backup data. In the context of backup and storage applications, a PBBA is a single storage device that is configured to serve multiple customers, with each customer using the same storage appliance for their protection storage requirements. A storage system that supports this type of multi-tenancy must satisfy security and isolation requirements to ensure that each customer's dataset is secured and isolated from the other customers on the storage appliance. These security and isolation requirements generally apply to data and control access operations on the storage appliance. For example, a customer must not be able to read or write to datasets that belong to another customer, or an administrator of one customer must not be able to perform system configuration, monitoring, etc., of the datasets that belong to another customer. Thus, although the customers may share the same storage appliance for backup, restore, or replicating their datasets, none of the customers can be aware of the presence of other customers in the storage appliance. The implementation of appropriate security and isolation requirements in such a storage system creates a Secure Multi-Tenancy (SMT) environment.

Protection storage systems are typically run by special operating systems that provide scalable, high-speed protection storage for backup, archive, and disaster recovery applications. One such operating system is the Data Domain Operating System (DDOS) provided by EMC® Corporation of Hopkinton, Mass., though other protection storage operating systems are also available. This type of operating system runs on data transfer and data storage machines, such as Data Domain Restorer (DDR) appliances. Generally, DDOS and similar operating systems presently do not natively support an SMT construct. That is, there is no inbuilt mechanism inside the DDOS that completely meets the security and isolation requirements that arise out of deploying multiple tenants on the same DDR. Thus, although the advent of SMT has led to the use of appliances, such as Data Domain Appliances for cloud deployments and "as-a-service" models, the security and isolation enhancements designed for such use cases created by new security information handling and management have not been adequately addressed at the operating system (e.g., DDOS) level.

Specific issues associated with present methods of handling security related information updates for related but distributed components, such as appliances in a set of PBBA systems or a cluster of PBBA systems include: (1) caching security information, (2) locking security information, and (3) chain propagation of updates for security information.

With regard to caching, each participant in a DDOS usually builds its own cache to store relations and associations pertaining to the security implementations. This may often introduce cache consistency problems in the overall network, since the objects involved are distributed entities in the DDOS. If one object's value/information changes, then caches maintained by other individual components may have to be invalidated and updated. In the case of a failed update or notification, correctness is compromised and such compromises may be very expensive and dangerous from a security perspective.

With regard to locking, security information updates may change information or value for one or more objects among a set of related objects. As mentioned above, such objects may be distributed in the DDOS across different entities, but they are related with regards to security considerations. Thus, there can be a security consideration dependency among this set of related objects. These objects are typically distributed across multiple DDOS components, which are all constituent entities participant in the underlying security mechanism to support SMT. Thus, multiple processes and threads are involved and any serialization/locking requirement imposed on all these entities may introduce prohibitive performance penalty and render the design and implementation infeasible. In general, the expense and expanse of the contention and its repercussions are unacceptable from the DDOS' perspective.

With regard to chain propagation of updates, the security related objects that experience a change or update in information or value are in a dependency or association relationship, as stated above. If a design is implemented such that other objects in the dependency relation need to be updated or notified of such a change, and there is a cascading of such an information or update flow, there will generally be a chain propagation requirement for such information changes and updates. Such a chain propagation requirement has the following problems: (1) the dependency on the chain of propagations requiring to be completed may introduce a delay in updating information in a memory or storage device that may be involved in making a security related decision, and such a delay may lead to a wrong security related decision being taken, thus compromising the security and isolation related requirements SMT; (2) such chain propagations impose a chain of correctness requirement, so that if an operation fails or introduces an error, the correctness requirement along the chain is not met; and (3) such chain propagations involve extra processing, which, if not reduced or eliminated can make the system much less efficient.

What is needed, therefore, is a protection storage operating system or implementation of DDOS that eliminates caching, locking and chain propagation of updates with regards to handling distributed but related security information elements.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that such aspects are not limited to any one embodiment. On the contrary, the scope of the invention is limited only by the claims and these encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments involve providing changes and updates for multiple distributed objects in a protection storage operating system that may be deployed, at least in part, through a wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. Such computers may be embodied in any appropriate type of processor-based device, such as a microprocessor or CPU (central processing unit) based computer or computing device.

Figure 1:
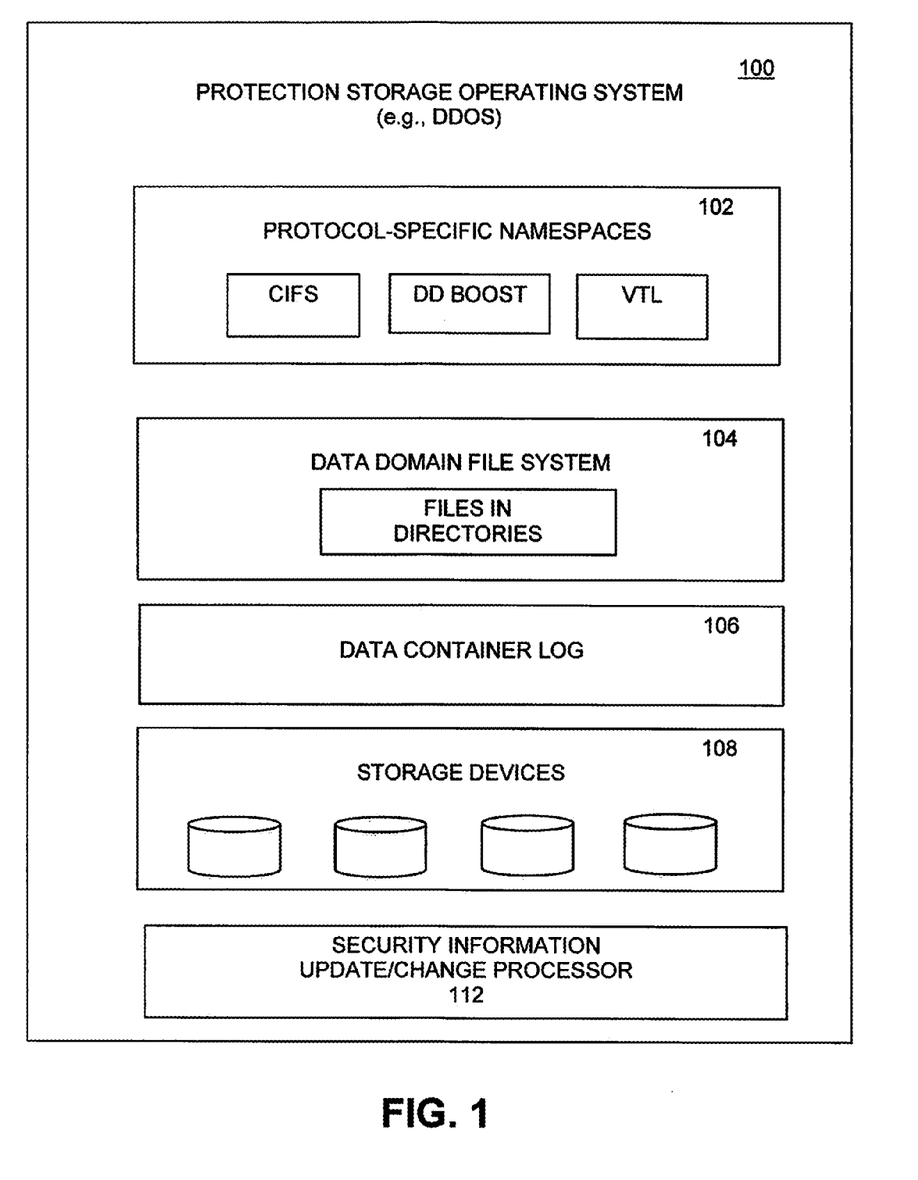
FIG. 1 is a diagram of a protection storage operating system environment implementing cache-free, lock-free and chain propagation-free handling of security information changes, under some embodiments.

Embodiments are directed to providing mechanisms to eliminate caching, locking, and chain propagation issues in a process or component that is natively built-in to the protection storage operating system (PSOS), such as a DDOS-based network, or other similar system that may generally be referred to as a "protection storage system." FIG. 1 is a diagram of a protection storage operating system implementing cache-free, lock-free and chain propagation-free handling of security information changes, under some embodiments. FIG. 1 illustrates logical and physical system layers of a protection storage or data domain (DD) environment that utilizes a protection storage operating system (PSOS), wherein one example implementation may be embodied by a DDOS system. In general, the term DDOS or data domain operating system will be used to refer generally to a protection storage operating system, and other specific types of PSOS may also be included within embodiments referred to by this term.

Within system 100 are several main components including protocol-specific namespaces 102, a data domain file system 104, a data container log 106, and storage device interfaces to external or internal storage devices 108, along with a network that provides connectivity to the various systems, components, and resources of system 100, and that may be implemented using protocols such as Transmission Control Protocol (TCP) and/or Internet Protocol (IP), well known in the relevant arts. For purposes of regular data storage applications, as well as storage-intensive applications, such as backup, replication, and archiving tasks for which the PSOS is specifically configured, the data generated within system 100 may be stored in persistent storage devices 108, which may be deployed locally or in a distributed manner. Thus, in an embodiment system 100 may be implemented to provide support for various storage architectures such as storage area network (SAN), Network-attached Storage (NAS), or Direct-attached Storage (DAS) that make use of large-scale network accessible storage devices 108, such as large capacity tape or drive (optical or magnetic) arrays. In an embodiment, the target storage devices, such as tape or disk array 108 may represent any practical storage device or set of devices, such as tape libraries, virtual tape libraries (VTL), fiber-channel (FC) storage area network devices, OST (OpenStorage) devices, and the like. In an embodiment, the storage devices 108 of FIG. 1 represent either single PBBA devices or a cluster of PBBA devices (PBBA cluster) that comprises a collection of PBBA nodes in any practical number.

In system 100, protocol-specific namespaces 102 are defined internal to the different PSOS components to store configuration information to facilitate accessing the logical file system layer 104. The files and directories (organized within MTrees or similar organization) all reference the same pool of unique segments, called a collection, which is made up of log-structured containers 106, which organize the segments on disk to optimize throughput and deduplication effectiveness.

In an embodiment in which system 100 comprises a DDOS system, the protocol-specific namespaces 102 store persistent information for protocols such as a data domain Virtual Tape Library (VTL), VTL over fiber channel (FC), data domain Boost storage units (e.g., for use with EMC NetWorker products, or similar), and CIFS/NIFS fileshares (over Ethernet). A data domain deployment may use any combination of these simultaneously to store and access data.

In an embodiment, the file system 104 contains files and directories that are stored within a hierarchical tree structure, such as MTrees. Special namespaces, such as VTL may be stored in special or dedicated directories. Other structures, such as MTree snapshots may also be used that share the same data segments and are space efficient. A "collection" is a set of files (or virtual tapes) and logical MTree snapshots. The system identifies and eliminates duplicates within each container and then writes compressed deduplicated segments to physical disk in 108. Segments are generally unique within the collection, and each data domain system has a single collection that is stored in a log of segment locality containers 106. As stated above, the storage devices 108 may be embodied in any one of a number of different types and devices. In an embodiment, the storage 108 comprises RAID-enabled disk storage in which the collection containers layer over RAID-enabled disk drive blocks.

In an embodiment, the data domain operating system 100 includes an internal or native process or component 112 that allows for changes and updates to distributed but related security information elements to be handled within the system in a manner that involves or requires no-caching, no locking and no chain propagation of these updates and information changes. Each component maintains their security related information in an independent manner. Whenever an operation requires a security decision to be taken, the security module pulls related information from such distributed information stores, builds a fresh set of information for every such operation request and acts on the fresh information set to allow or deny such operation requests. Since there is no caching involved, every security related decision works on the most updated information state. Locking free algorithms ensure system wide performance feasibility, and the elimination of chain propagation also ensures security information freshness, correctness and eliminates inefficient communication within the system.

In an embodiment, process 112 operates generally for data access operations to the storage devices 108. Such data may be organized and accessed as files or other data elements or objects depending on the type of storage device architecture, configuration, data/file management system, and so on. For example, if the storage layer is an NAS system, the data access operations may comprise file transfer operations, whereas if the storage layer is a SAN environment (which organizes data as a block) or a DDFS environment (which organizes data as segments), the data access operations may work on different data elements (e.g., blocks, segments, objects, sequences, etc.). Thus, "data access operation" is intended to mean any type of access and/or control operation that acts on data or metadata elements in any appropriate format, configuration, arrangement, etc., as defined within the system 100.

Figure 2:
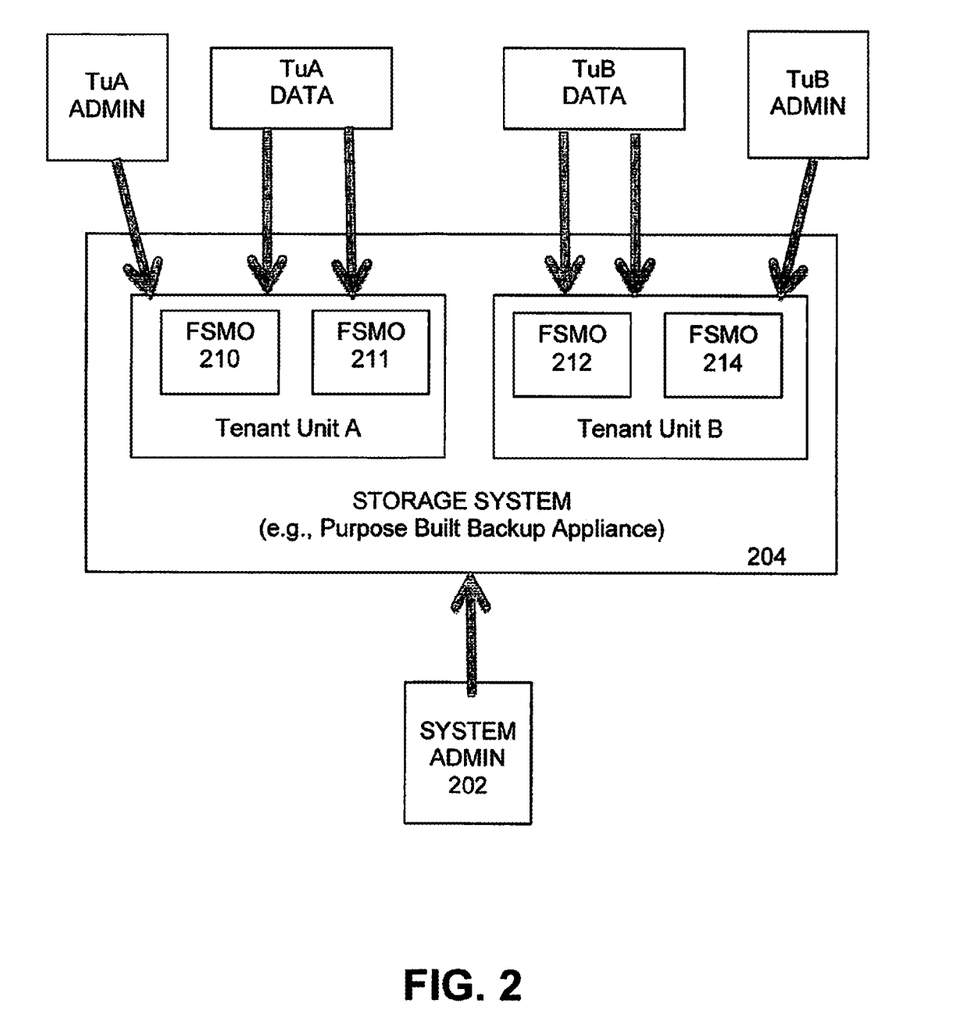
FIG. 2 is a block diagram illustrating an example of a storage system (e.g., a PBBA), under some embodiments.

Processing block, or hardware component 112 provides techniques and mechanisms for efficient communication of security information changes and updates in an SMT system to provide security and isolation to tenants in a PSOS system. As shown in FIG. 1, one or more of the components in DDOS system 100 may comprise purpose built backup appliances (PBBAs), such as in storage layer 108. PBBAs generally refer to devices that employ or implement disk-based data protection technologies to protect and recover data and applications, and that include features such as data deduplication, compression, encryption, and replication. FIG. 2 is a block diagram illustrating an example of a storage system (e.g., a PBBA) for use in a PSOS, under some embodiments. As shown in FIG. 2, a Purpose Built Backup Appliance (PBBA) 204 has been deployed with two customers or tenants, denoted Tenant Unit A and Tenant Unit B. PBBA 204 includes file system management objects (FSMOs) 210-214. File system management objects may include objects such as Mtrees, DDBoost storage units, VTL pools, or other similar objects that operate at a file system level. For the example embodiment of FIG. 2, FSMOs 210-211 are allocated to Tenant Unit A, and FSMOs 212-214 are allocated to Tenant Unit B. As used herein, a tenant unit refers to the highest unit of abstraction for providing security and isolation in the operating system. A tenant unit also acts as the highest abstraction for allocating and tracking resource utilization by a tenant. Here, FSMO refers to a unit of storage allocation that presents a unique and self-contained namespace for a tenant. Each tenant can be allocated one or more FSMOs. Tenant-unit A and tenant-unit B have been assigned the Tu names TuA and TuB, respectively. TuA is allocated to Tenant A, and TuB is allocated to Tenant B. As used herein, a tenant can be a business unit within a large enterprise (e.g., a finance department, marketing department, etc.). A tenant can also refer to an enterprise, such as when a storage appliance is deployed by a service provider.

Mechanisms may be provided to only allow tenant A to access FSMOs associated with its tenant-unit (e.g., FSMOs 210-211), and only allows tenant B to access FSMOs associated with its tenant unit (e.g., FSMOs 212-214). FSMOs 210-214 can be accessed by tenants A and B using various protocols. For example, tenants A and B can access FSMOs 210-214 using the 1) DDBoost protocol (available from EMC® Corporation of Hopkinton, Mass.), in which case FSMOs 210-214 are known as "storage units", 2) Network File System (NFS) or Common Internet File System (CIFS) protocol, in which case FSMOs 210-214 are known as Mtrees, 3) Virtual Tape Library (VTL) protocol, in which case FSMOs 210-214 are known as VTL pools, or 4) Protection Point protocol, in which case FSMOs 210-214 are known as Vdisks. Various other protocols can be used under other embodiments.

In an embodiment, storage system 204 enables tenants A and B to have their own respective tenant administrators, and thus do not necessarily need to rely on system administrator 202. As used herein, a system administrator (admin) can be authorized to perform all operations in the storage system. A tenant administrator, on the other hand, is only authorized to perform a subset of the operations that are available to the system admin. A tenant admin is also distinguished from a system admin in that a tenant admin can only access objects that are associated with the Tu that the tenant admin has been allocated. A tenant user can only perform a subset of the operations that are available to the tenant admin. The admin functions may be provided in the form of computerized, processor-based, or other machine automated process that is overseen by a human operator.

Figure 3:
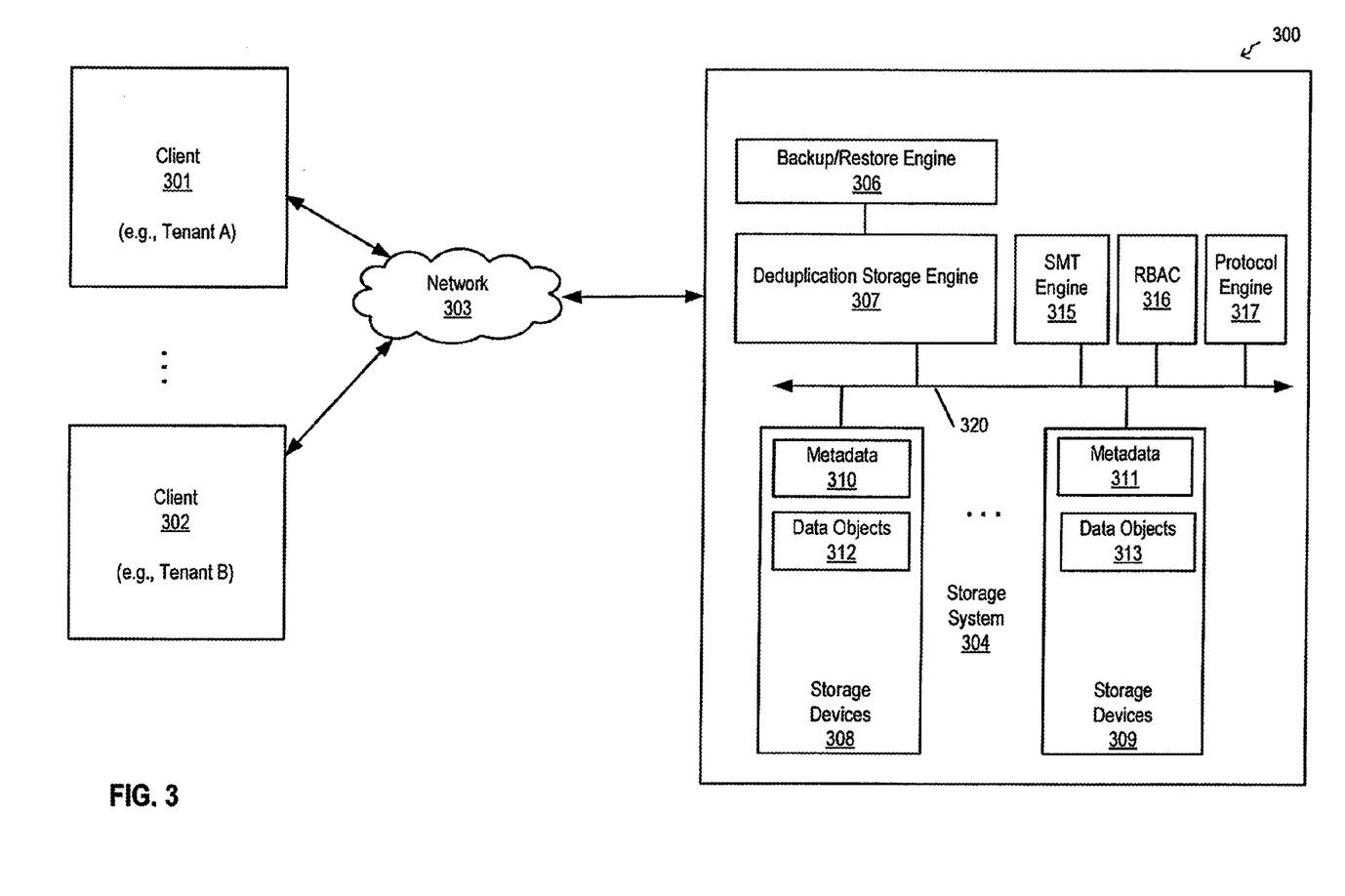
FIG. 3 is a block diagram illustrating a storage system that may implement one or more embodiments of a security information update/change process.

FIG. 3 is a block diagram illustrating a storage system that may implement one or more embodiments. For example, storage system 304 may be implemented as part of storage system 204. Referring to FIG. 3, system 300 includes, but is not limited to, one or more client systems 301-302 communicatively coupled to storage system 304 over network 303. Clients 301-302 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 303 may be any type of networks such as a local area network (LAN), a wide area network (WAN) such as Internet, a corporate intranet, a metropolitan area network (MAN), a storage area network (SAN), a bus, or a combination thereof, wired and/or wireless. For example, client 301 may represent a first tenant (shown as tenant A), and client 302 may represent a second tenant (shown as tenant B). In FIG. 3, each tenant is represented by one client for the sake of simplicity. It shall be understood, however, that each tenant may access storage system 304 through multiple clients.

Storage system 304 may include any type of server or cluster of servers. For example, storage system 304 may emulate a storage server used for any of various different purposes, such as to provide multiple users with access to shared data and/or to backup mission critical data. Storage system 304 may be, for example, a file server (e.g., an appliance used to provide network attached storage (NAS) capability), a block-based storage server (e.g., used to provide SAN capability), a unified storage device (e.g., one which combines NAS and SAN capabilities), a nearline (also known as an archive) storage device, a direct attached storage (DAS) device, a tape backup device, or essentially any other type of data storage device. Storage system 304 may have a distributed architecture, or all of its components may be integrated into a single unit. Storage system 304 may be implemented as part of an archive system (e.g., Extended Retention Tier) and/or backup system such as a deduplicating storage system available from EMC® Corporation.

In one embodiment, storage system 304 includes, but is not limited to, backup/restore engine 306, deduplication storage engine 307, and one or more storage devices 308-309 communicatively coupled to each other. Storage devices 308-309 may be implemented locally (e.g., single node operating environment) or remotely (e.g., multi-node operating environment) via interconnect 320, which may be a bus and/or a network. In one embodiment, one of the storage devices 308-309 operates as an active storage to receive and store external or fresh user data, while the other storage devices operates as a target storage device to periodically archive data from the active storage device according to an archiving policy or scheme. Storage devices 308-309 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage devices 308-309 may also be a combination of such devices. In the case of disk storage media, the storage devices 308-309 may be organized into one or more volumes of Redundant Array of Inexpensive Disks (RAID).

In response to a data file to be stored in storage devices 308-309, deduplication storage engine 307 is configured to segment the data file into multiple chunks according to a variety of segmentation policies or rules. Deduplication storage engine 307 may choose not to store a chunk in a storage device if the chunk has been previously stored in the storage device. In the event that deduplication storage engine 307 chooses not to store the chunk in the storage device, it stores metadata enabling the reconstruction of the file using the previously stored chunk. As a result, chunks of data files are stored in a deduplicated manner, either within each of storage devices 308-309 or across at least some of storage devices 308-309. Data stored in the storage devices may be stored in a compressed form (e.g., lossless compression: Huffman coding, Lempel-Ziv Welch coding; delta encoding: a reference to a chunk plus a difference; etc.). In one embodiment, different storage devices may use different compression methods (e.g., main or active storage device from other storage devices, one storage device from another storage device, etc.).

The metadata, such as metadata 310-311, may be stored in at least some of storage devices 308-309, such that files can be accessed independent of another storage device. Metadata of each storage device includes enough information to provide access to the files it contains. In one embodiment, metadata may include fingerprints contained within data objects 312-313, where a data object may represent a data chunk, a compression region (CR) of data chunks, or a container of one or more CRs. Fingerprints are mapped to a particular data object via metadata 310-311, enabling the system to identify the location of the data object containing a chunk represented by a particular fingerprint. When an active storage device fails, metadata contained in another storage device may be utilized to recover the active storage device. When one storage device is unavailable (e.g., the storage device has failed, or is being upgraded, etc.), the system remains up to provide access to any file not stored in the failed storage device. When a file is deleted, the metadata associated with the files in the system is updated to reflect that the file has been deleted.

In one embodiment, the metadata information includes a file name, a storage device where the chunks associated with the file name are stored, reconstruction information for the file using the chunks, and any other appropriate metadata information. In one embodiment, a copy of the metadata is stored on a storage device for files stored on a storage device so that files that are stored on the storage device can be accessed using only the information stored on the storage device. In one embodiment, a main set of metadata information can be reconstructed by using information of other storage devices associated with the storage system in the event that the main metadata is lost, corrupted, damaged, etc. Metadata for a storage device can be reconstructed using metadata information stored on a main storage device or other storage device (e.g., replica storage device). Metadata information further includes index information (e.g., location information for chunks in storage devices, identifying specific data objects).

In one embodiment, the storage system as shown in FIG. 3 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, backup/restore engine 306 is responsible for backing up data from remote clients (e.g., clients 301-302) to one or more local storage devices (e.g., storage devices 308-309). Backup/restore engine 306 is also responsible for restoring and/or replicating data from one or more local storage devices to the remote clients.

In an embodiment, storage system includes SMT engine 315 configured to provide security and isolation to each tenant. For example, SMT engine 315 is configured to allocate tenant units (Tus) to tenants by managing various configuration metadata elements (config-metadata). Protocol engine 317 is configured to use these config-metadata to determine whether tenants may perform data access of FSMOs at storage system 304. Role based access control (RBAC) 316 is configured to use the config-metadata to determine whether tenants may perform control access of the FSMOs and various other resources at storage system 304.

Processing Security Information Changes/Updates

Figure 4:
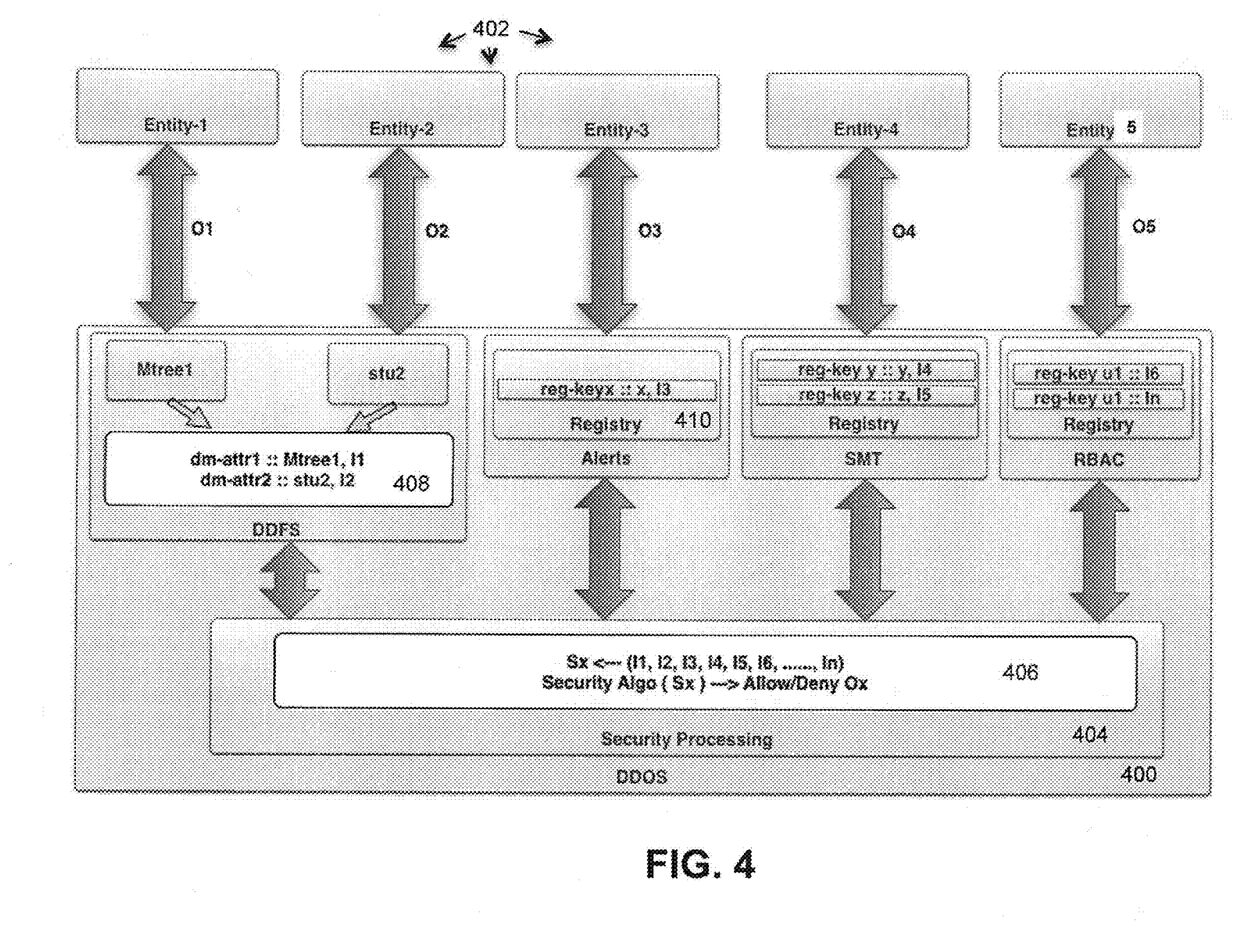
FIG. 4 is a diagram that illustrates a component and process that performs cache-free, lock-free and chain propagation-free processing of security information changes/updates, under some embodiments.

For an SMT system, such as shown in FIG. 2, various processes associated with the tenants/clients 301 and 302 may generate and/or process data that represent different but related objects with regard to security and isolation factors. As shown in FIG. 1, the data domain operating system 100 that may include a storage system 204 or 300 as illustrated in FIGS. 2 and 3, includes or utilizes a process 112 for transmitting these information changes and updates through the system in a manner that eliminates the use of caching, locking, or chain propagation mechanisms. FIG. 4 is a diagram that illustrates a component and process that performs cache-free, lock-free and chain propagation-free processing of security information changes/updates, under some embodiments. As shown in FIG. 4, a data domain restorer (DDR) system is deployed in an SMT/as-a-service deployment model. External entities 402 such as backup applications or App Directs issue a number (n) of operations on the DDR. For the example implementation of FIG. 4, Entity-1 is an NFS/CIFS client, Entity 2 is a DDBoost client, and Entities-3, Entity-4, and Entity-5 are CLI/GUI/SNMP clients. The entities and their respective operations are provided for purposes of example and illustration only, and many other types and configurations of external entities are possible.

As shown in FIG. 4, each entity generates a respective operation, O. The operations may be data access operations and are denoted, O1, O2, O3, O4, O5, with one operation per entity at any one time, though other arrangements are possible. The operations represent changes or data access requests that trigger the need to perform a security check to ensure that tenant and system information is maintained securely and not compromised. Such operations may be data read/write operations or administrative configuration changes, or similar operations. In these cases, the validity of the requestor must be verified to ensure that the proper tenant users and/or administrators are accessing the proper data sources and/or requesting appropriate changes. RBAC and other access control mechanisms are typically used to determine which operations are subject to such security and isolation checks.

Thus, as shown in FIG. 4, the operations (O1 to O5) constitute operations that need to be validated from a security and isolation point of view in deployment scenarios typically employed in an SMT environment. Some of these operations may change or update or read a number (n) of security related information elements, I, (denoted I1, I2, I3, I4, I5, I6, . . . , In). The number of information elements may correspond to the number of operations, or there may be a different number of information elements n, as compared to number of operations, say m. As stated above, the operations may comprise operations that perform read/write data access operations and/or configuration change actions. For the example of FIG. 4, operation 2 (O2) illustrates a data access operation that is sent from entity-2 to storage unit 2 (stu2) in accordance with a file request conforming to the MTree directory organization of the DDFS. Operation 3 (O3) illustrates a configuration operation, such as either a request for configuration information or a request to change configuration setting(s). In an embodiment, such an operation uses registry keys stored in a registry within a DDOS component, such as Alerts, as shown. In general, the Alerts, RBAC and SMT DDOS components, among other similar components, are triggered by a control action which is received and that deals with configuration control. The registry comprises a persistent store device or resource that stores configuration information, and can be implemented through any appropriate memory device.

An important aspect of the security information processing method that eliminates the need for caching, locking, and chain propagation is the storage of security related information in a persistent memory location of each DDOS component. As shown in FIG. 4, the DDFS component includes a storage element 408 that stores certain attributes denoted dm-attr1 and dm-attr2. Any number of attributes may be stored in storage element 408, and this storage element stores all of the attributes for the DDFS component within the DDOS system 400. Each attribute is associated with one FMSO (Mtree1, stu2, etc.). The DM attributes store security related information/mapping that indicates which tenant-unit owns a particular FSMO. Thus, the attributes designate at least the identity of the tenant (Entity-n) that can access each FMSO. The attributes also designate the associated security related information (In). A unique tenant user-access or security related information element is defined by each attribute. Based on which tenant-unit owns which FSMO, tenant user-access can be determined, such as by comparing the tenant associated with a user to the tenant identifier associated with the FSMO.

Storage element 408 represents the storage element that is used with respect to file accesses (e.g., data r/w operations) in a file system (e.g., DDFS) component, or other data access operations in a data management system. For components that handle configuration information or system actions, the corresponding storage element may be referred to as a registry, such as registry 410 in the Alerts component. The attributes stored in a registry are referred to as registry keys (reg-keys) in the example of FIG. 4, and each registry per corresponding DDOS component (e.g., Alerts, SMT, RBAC, etc.) stores all of the reg-keys for that component within the DDOS system 400. Like the dm-attributes for the file system components, the registries designate the tenant user-access and/or the security information elements associated with the operations (On) impacting the DDOS components. The use of the registry and dm-attribute storage locations to store the relevant tenant and security information identifiers essentially tags the tenant configuration and FSMOs with this information and facilitates in-line, real-time processing by the security layer 404.

As shown in FIG. 4, the operations (On) which may involve data and metadata accesses or control operations, are sent to security process 406 of the security layer 404. This block determines, in real time as the operation commands or requests are received, a dependency matrix that establishes connections between the tenant (Entity-n) and the security related information (In). The dependency matrix basically maps the one or more components that may be involved with or impacted by the operation (On) that implicates the information element (In). Thus, the dependency matrix lays out which components, or processes, a particular request impacts. A security check may be performed even if only a single component is impacted, but in cases where two or multiple components are impacted, a security check is generally performed. Based on the dependencies, the security layer communicates with the relevant components to determine the propriety of the request. For example, the security layer may perform a check to determine whether a requester belongs to a particular tenant, whether requester user has appropriate credentials to gain access to a file or perform an operation, and so on. If the answer is yes, then the security process 406 allows the request, otherwise the request is denied.

FIG. 4 illustrates the processing function of the security process 406, which is configured to make a decision as to whether to allow or deny a particular operation request (Ox). To perform this task, the security layer 404 communicates with various processes and components and forms a set upon which to execute one or more security algorithms. This security set is denoted Sx and comprises the set of information elements (I1 to In). Hence, for the example embodiment of FIG. 4, $Sx \leftarrow (I1, I2, I3, I4, I5, I6, \ldots, In)$. The security layer applies the security algorithm(s) on this set to arrive at a decision to allow or deny each respective operation, Ox.

In an embodiment, the security algorithm is applied by the security process 406 to all DDOS components and/or participants in the system 400. In an example DDOS environment, this may include a Directory Manager (DM) in DDFS, DDBoost, System Management Services (SMS), RBAC, Alerts, SMT, and other similar components.

Figure 5:
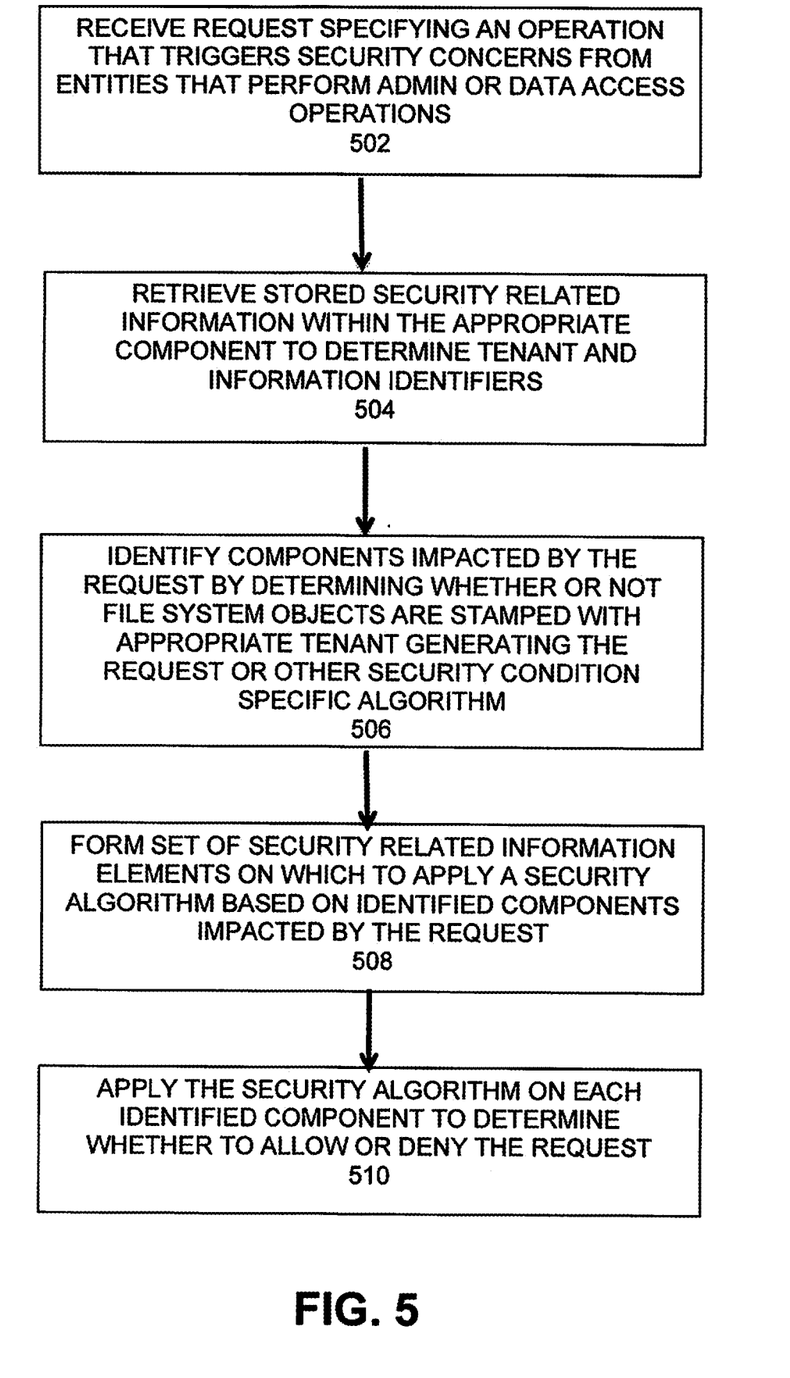
FIG. 5 is a flowchart that illustrates a method of processing security related information requests, under an embodiment.

FIG. 5 is a flowchart that illustrates a method of processing security related information requests, under an embodiment. The method of FIG. 5 essentially comprises stamping each requested operation with relevant tenant identifiers (IDs) and security related information IDs, setting up a dependency matrix for the operations, and performing a security check on each operation by dynamically querying each identified component to determine the propriety of the request. The process of FIG. 5 assumes that security related information (I) has been stored locally in a persistent storage location within each relevant DDOS component that might be impacted by a data access request. As mentioned above, such storage locations may be a DM attribute store (dm-attr) for file system components, or a registry. The object value or information element is stored as a data object denoted Ix, as shown in FIG. 4.

As shown in FIG. 5, the process begins with the receipt of a request that specifies an operation that triggers security concerns, such as from entities that are requesting to perform administrative/configuration/control operations, or data access operations (e.g., file read/write operations), block 502. One such operation may be a DDOS data access operation (e.g., update/change, data-read, metadata-read, etc.). In block 504, the process accesses the stored security related information stored within the appropriate component to determine the tenant and information identifiers associated with the operation. The appropriate component may be a data-storage component, in which case the storage location is a DM attribute storage, or it may be a registry. Note that this defines a subset of all of the components of the system, since, as shown in FIG. 4, only certain components store certain identifiers based on the type of operation created by the request, such as the namespaces (RBAC, Alerts, and so on). In an embodiment, these namespaces are persistent configuration namespaces/DDR registries, and are called "config namespaces" that correspond to registries in DDOS.

In block 506, the process determines whether or not the file system objects implicated by the request are stamped with the appropriate tenant generating the request, such as through the tagging of the MTree1, I1 for dm-attr1 shown in FIG. 4. This step essentially identifies those components in the system that are impacted by the request (identified components) and which are subject to a security consideration specific algorithm. Instead of a simple matching of tenant to information element, there may be other or alternative security condition specific checks that may need to be performed, such as credential checks and so on. The process then forms a set of security related information elements on which to apply the security algorithm based on the identified components, block 508. This set may be formed iteratively for each component within the system, such that a security algorithm is applied to independent identified components or sets of identified components within the system. In this manner, a security algorithm, Sx, may be applied to a number of elements Ii, where the process is iterated over a number, i, of elements. The security algorithm Sx defines the different tenant-to-information element and/or security conditions that need to be satisfied in order to allow or deny the operation request, shown in block 510.

As a processor-executed program, or processing algorithm, the method of FIG. 5 can be expressed in pseudo code terms in the following algorithmic expression:
    a. for i=component_0; i<component_max_num; i++-→
    i. Send a read request to component_i for Ii.
    ii. Store the value of Ii locally with the security component.
    b. for i=component_0; i<component_max_num; i++-→
    i. Read the value of Ii stored locally and associate this value with a set Sx (Sxi←Ii).
    c. Apply security consideration specific algorithm Sa to Sx.
    d. Issue allow/deny response for operation request Ox.

In the above expression, the term i is a program counter value, and does not correspond to the information element (I) of FIG. 4. As mentioned above, the iteration over i does not necessarily involve all elements in the system, since, depending on the operation, the process matches the identities impacted by the request, and this creates a select subset of elements in the system.

In order to issue an allow/deny response for any security operation request Ox (e.g., O1 to O5), the process takes into consideration the information/value stored with each component, and the tenant ID that is tagged with this information value through the DM attribute or registry storage mechanisms. The process makes the decision to allow or deny in line and on the fly as the request is received and processed. This mechanism effectively distributes the identifier of tenant ownership of all objects across all elements, and this is dynamically used by the security process without the need to access databases or external sources for this information. This mechanism provides the isolation factor required by SMT systems, since each MTree (or similar file system object) can only be stamped with one tenant.

The request handling and security processing aspect shown in FIGS. 4 and 5 facilitate the non-caching design and handling of changes/updates in information on a set of distributed but inter-dependent objects related to DDOS security. It also allows for lock-free design and handling of changes/updates in information for these entities, and eliminates the requirement for chain propagation of updates for these entities.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   receiving a request from a requester of a plurality of requesters, the request specifying an operation having security related information for elements in a network encompassing a protection storage operating system (PSOS), the PSOS having a first set of components handling data access operations and a second set of components handling configuration operations;
   storing, through a storage processing function of the PSOS, an identifier of the requester and a security related information element locally within a storage location of the first or second set of components;
   accessing, upon receiving the request in a security function of the PSOS, the security related information element and requester identifier to match other elements of the network impacted by the request; and
   performing, by the security function, a security condition specific check to determine whether or not the request is to be allowed or denied, wherein the PSOS comprises a data domain operating system (DDOS), and wherein the first set of components handling data access operations comprises data domain file system (DDFS) components and the second set of components handling configuration operations comprises at least one of an alerts component, a secure multi-tenancy (SMT) component, a systems management services (SMS) component, and a role-based access control (RBAC) component, and wherein the storage location of the first set of components comprises a data structure stored in a first persistent memory device and configured to store attribute information of the requester and the security related information, and wherein the storage location of the second set of components comprises a registry stored in a second persistent memory device.

2. The method of claim 1 wherein PSOS comprises a purpose-built backup appliance (PBBA) cluster comprising a plurality of PBBA nodes.

3. The method of claim 2 wherein the storage of security related information in a persistent memory location of each component of the PSOS eliminates a need for caching, locking, and chain propagation of the security related information through the PSOS.

4. The method of claim 1 wherein the security condition specific check comprises determining whether other elements of the network impacted by the request are matched through at least one of the identifier of the requester, the security related information element stored locally within the storage locations of the first or second set of components.

5. The method of claim 4 further comprising generating a dependency matrix for the request comprising a relational coupling of the requester and the other elements of the network impacted by the request.

6. The method of claim 2 wherein the PSOS comprises part of a multi-tenant network, and wherein the plurality of requesters each comprise a tenant unit accessing executable applications, data files and configuration information stored on storage devices coupled to the network through partitions defined for each tenant unit of a plurality of tenant units.

7. A system comprising:
   an interface to a protection storage device within a protection storage operating system (PSOS), the PSOS having a first set of components handling data access operations and a second set of components handling configuration operations, and configured to receive a request specifying an operation having security related information impacting elements in the PSOS;
   a first set of components handling data access operations within the PSOS, each component of the first set of components storing, in first storage locations, user access and corresponding security related information, for operations impacting respective components of the first set of components;
   a second set of components handling configuration operations within the PSOS, each component of the second set of components storing, in second storage locations, user access and corresponding security related information for operations impacting respective components of the second set of components; and
   a security component accessing, upon receipt of the operation, the first and second storage locations to determine appropriate access credentials and identifiers of the impacted elements of the PSOS to deny or allow the request, wherein the PSOS comprises a data domain operating system (DDOS), and wherein the first set of components handling data access operations comprises data domain file system (DDFS) components and the second set of components handling configuration operations comprises at least one of an alerts component, a secure multi-tenancy (SMT) component, a systems management services (SMS) component, and a role-based access control (RBAC) component, and wherein the storage location of the first set of components comprises a data structure stored in a first persistent memory device and configured to store attribute information of the requester and the security related information, and wherein the storage location of the second set of components comprises a registry stored in a second persistent memory device.

8. The system of claim 7 wherein PSOS comprises a purpose-built backup appliance (PBBA) cluster comprising a plurality of PBBA nodes.

9. The system of claim 7 wherein the storage of security related information in a persistent memory location of each component of the PSOS eliminates a need for caching, locking, and chain propagation of the security related information through the PSOS.

10. The system of claim 9 wherein the security component, upon receipt of the operation, generates a dependency matrix for the request comprising a relational coupling of a requester transmitting the request and the impacted elements of the PSOS.

11. The system of claim 8 wherein the PSOS comprises a data domain operating system (DDOS), and wherein the first set of components handling data access operations comprises data domain file system (DDFS) components, and wherein at least one of the nodes is a data domain restorer (DDR) appliance.

12. The system of claim 7 wherein the security component executes a security condition specific check that determines whether elements of the PSOS impacted by the request are matched through at least one of the identifier of the requester, the security related information element stored locally within the first storage locations or second storage locations.

13. The system of claim 7 wherein at least one of the nodes comprising a PBBA accesses a memory of the storage devices and performs at least one of backup, archiving, and disaster recovery operations for at least one of a plurality of tenant units.

14. The system of claim 9 wherein the request comprises at least one of a data access operation involving a data read or write operation, and a configuration request involving a control or update operation performed on a resource of the PSOS.

15. A computer program product comprising a non-transitory computer usable medium having machine readable code embodied therein for:
receiving a request from a requester of a plurality of requesters, the request specifying an operation having security related information for elements in a network encompassing a protection storage operating system (PSOS), the PSOS having a first set of components handling data access operations and a second set of components handling configuration operations;
storing, through a storage processing function of the PSOS, an identifier of the requester and a security related information element locally within a storage location of the first or second set of components;
accessing, upon receiving the request in a security function of the PSOS, the security related information element and requester identifier to match other elements of the network impacted by the request; and
performing, by the security function, a security condition specific check to determine whether or not the request is to be allowed or denied, wherein the PSOS comprises a data domain operating system (DDOS), and wherein the first set of components handling data access operations comprises data domain file system (DDFS) components and the second set of components handling configuration operations comprises at least one of an alerts component, a secure multi-tenancy (SMT) component, a systems management services (SMS) component, and a role-based access control (RBAC) component, and wherein the storage location of the first set of components comprises a data structure stored in a first persistent memory device and configured to store attribute information of the requester and the security related information, and wherein the storage location of the second set of components comprises a registry stored in a second persistent memory device.

* * * * *